(12) United States Patent
Keller et al.

(10) Patent No.: US 9,741,216 B1
(45) Date of Patent: Aug. 22, 2017

(54) SKIN STRETCH INSTRUMENT

(71) Applicant: Oculus VR, LLC, Menlo Park, CA (US)

(72) Inventors: Sean Jason Keller, Kirkland, WA (US); David R. Perek, Bellevue, WA (US); Tristan Thomas Trutna, Seattle, WA (US); Garett Andrew Ochs, Seattle, WA (US); Nicholas Roy Corson, Mukilteo, WA (US); Raymond King, Redmond, WA (US)

(73) Assignee: Oculus VR, LLC, Menlo Park, CA (US)

( * ) Notice: Subject to any disclaimer, the term of this patent is extended or adjusted under 35 U.S.C. 154(b) by 0 days.

(21) Appl. No.: 15/294,390

(22) Filed: Oct. 14, 2016

(51) Int. Cl.
  *H04B 3/36* (2006.01)
  *G08B 6/00* (2006.01)

(52) U.S. Cl.
  CPC ..................... *G08B 6/00* (2013.01)

(58) Field of Classification Search
  CPC .......... A61B 5/6802; G08B 6/00; G06F 3/014
  USPC ............................ 340/407.1, 573.1, 4.12, 7.6
  See application file for complete search history.

(56) References Cited

U.S. PATENT DOCUMENTS

| | | | | |
|---|---|---|---|---|
| 5,709,219 A | * | 1/1998 | Chen | A63F 13/06 345/156 |
| 2002/0054060 A1 | * | 5/2002 | Schena | G01D 7/007 715/701 |
| 2014/0026893 A1 | * | 1/2014 | Johnson | A61H 3/008 128/845 |
| 2017/0036066 A1 | * | 2/2017 | Chahine | A41D 1/002 |
| 2017/0042467 A1 | * | 2/2017 | Herr | A61B 5/6828 |

* cited by examiner

*Primary Examiner* — Phung Nguyen
(74) *Attorney, Agent, or Firm* — Fenwick & West LLP

(57) ABSTRACT

A sensor records information about skin stretch perceived by a user based on an interaction with a real object. The sensor includes a mechanical housing configured to be worn on a finger of a user, and a mechanism coupled to the mechanical housing. The mechanism includes a first bearing that rotates in a first direction in response to an interaction with a surface. The mechanism also includes a second bearing coupled to the first bearing, such that rotation of the first bearing causes the second bearing to rotate in a direction opposite to the first direction. The second bearing is in contact with a portion of the finger, and includes a feedback surface that simulates a force associated with the interaction with the surface. The sensor includes a controller configured to monitor rotation of the second bearing and record skin stretch information responsive to the interaction with the surface.

20 Claims, 10 Drawing Sheets ately, the VR system 100 may include two haptic devices 140 (e.g., one for each hand) that are worn by the same user. As another example, the VR system 100 may include multiple haptic devices 140 intended to be worn by multiple users, with each haptic device 140 or each pair of haptic devices 140 associated with a different HMD 110. In alternative configurations, different and/or additional components may be included in the VR system 100.

SKIN STRETCH INSTRUMENT

BACKGROUND

The present disclosure generally relates to devices that instrument and augment user interaction with real objects, and specifically to using mechanical actuators that stretch a user's skin to amplify or diminish shear forces between a fingertip and a real object.

Virtual reality and augmented reality (VR/AR) systems often include devices, such as a VR/AR headset and headphones, which operate together to provide multiple forms of sensory output that create the illusion that a user is immersed in a virtual world or augmented world. A VR/AR system can also include an input device such as a VR glove that allows a wearer of the glove some limited interaction with virtual objects (e.g., picking up a virtual object). However, conventional VR gloves provide little feedback to the user to help the interaction with the virtual object feel like an interaction with a real object.

SUMMARY

A skin stretch instrument, also referred to as a skin stretch sensor, records information about skin stretch perceived by a user based on an interaction with a real object. During calibration, a user wearing the skin stretch sensor interacts with different real objects and/or real surfaces. The skin stretch information recorded by the skin stretch sensor is saved with a mapping to information about the interaction. For example, a user's fingers interacting with a real object (e.g., an apple) would undergo some amount of skin stretch which is described using skin stretch information. The skin stretch information can then be mapped to the interaction with the real object. In a VR system, AR system, mixed reality (MR) system, or some combination thereof, the saved skin stretch information may be used by the skin stretch sensor to cause skin stretch on the skin of a user wearing the skin stretch sensor, in response to the user interacting with a corresponding virtual object and/or virtual surface. The skin stretch sensor includes a skin stretch mechanism that may comprise one or more gears and rollers that rotate when the user interacts with a real object. For example, a first roller coupled to a first gear contacts the real object and causes a second roller coupled to a second gear to rotate in the opposite direction. A controller in the skin stretch sensor records information about the rotation of the gears and rollers, and saves the information in a database.

In some embodiments, the skin stretch sensor includes a mechanical housing and a skin stretch mechanism. The mechanical housing is configured to be worn on a finger of a user, and the skin stretch mechanism is coupled to the mechanical housing. The skin stretch mechanism includes a mechanical transmission comprising a first bearing and a second bearing. The first bearing is configured to rotate in a first direction in response to an interaction with a surface. The second bearing is coupled to the first bearing, such that rotation of the first bearing causes the second bearing to rotate in a direction opposite to the first direction. The second bearing is coupled to (or includes) a feedback surface that is configured to be in contact with a portion of the finger. The feedback surface is configured to simulate a force associated with the interaction with the surface. In some embodiments, the sensor also includes a controller configured to monitor rotation of the second bearing and record skin stretch information responsive to the interaction with the surface.

The figures depict various embodiments of the present invention for purposes of illustration only. One skilled in the art will readily recognize from the following discussion that alternative embodiments of the structures and methods illustrated herein may be employed without departing from the principles of the disclosure described herein.

DETAILED DESCRIPTION

System Overview

Figure 1:
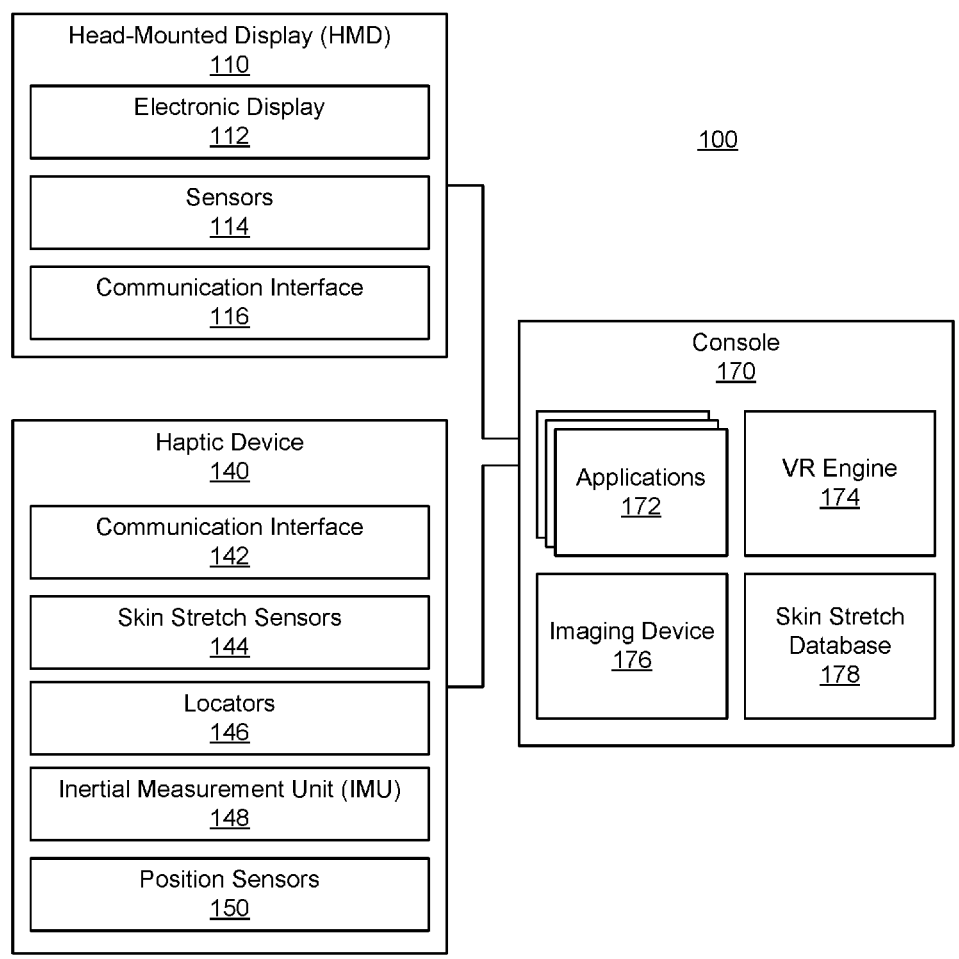
FIG. 1 is a block diagram of a VR system, in accordance with an embodiment.

FIG. 1 is a block diagram of a VR system 100 in which a haptic device 140 operates. In some embodiments, the VR system 100 may also operate in AR and/or MR environments. The VR system 100 shown in FIG. 1 comprises a HMD 110 and a haptic device 140 that are both coupled to a console 170. While FIG. 1 shows an example VR system 100 including one HMD 110, one haptic device 140 and one console 170, in other embodiments any number of these components may be included in the VR system 100. For example, the VR system 100 may include two haptic devices 140 (e.g., one for each hand) that are worn by the same user. As another example, the VR system 100 may include multiple haptic devices 140 intended to be worn by multiple users, with each haptic device 140 or each pair of haptic devices 140 associated with a different HMD 110. In alternative configurations, different and/or additional components may be included in the VR system 100.

The HMD 110 is a head-mounted display that presents media to a user. Examples of media presented by the HMD 110 include images, video, audio, or some combination thereof. In some embodiments, audio is presented via an external device (e.g., speakers and/or headphones) that receives audio information from the HMD 110, the console 170, or both, and presents audio data based on the audio information.

The HMD 110 includes an electronic display 112, sensors 114, and a communication interface 116. The electronic display 112 displays images to the user in accordance with data received from the console 170. In various embodiments, the electronic display 112 may comprise a single electronic display 112 or multiple electronic displays 112 (e.g., one display for each eye of a user).

The sensors 114 include one or more hardware devices that detect spatial and motion information about the HMD 110. Spatial and motion information can include information about the position, orientation, velocity, rotation, and acceleration of the HMD 110. For example, the sensors 114 may include gyroscope that detects rotation of the user's head while the user is wearing the HMD 110. This rotation information can then be used (e.g., by the VR engine 174) to adjust the images displayed on the electronic display 112.

The communication interface 116 enables input and output to the console 170. In some embodiments, the communication interface 116 is a single communication channel, such as HDMI, USB, VGA, DVI, or DisplayPort. In other embodiments, the communication interface 116 includes several distinct communication channels operating together or independently. In one embodiment, the communication interface 116 includes wireless connections for sending data collected by the sensors 114 from the HMD 110 to the console 170 but also includes a wired HDMI connection or DVI connection that receives audio/visual data to be rendered on the electronic display 112.

In one embodiment, the haptic device 140 is a garment that is worn on the user's hand. The haptic device 140 collects information about the user's hand that can be used as input for applications 172 executing on the console 170. In the illustrated embodiment, the haptic device 140 includes a communication interface 142, skin stretch sensors 144, locators 146, an inertial measurement unit 148, and position sensors 150. The haptic device 140 may include additional components that are not shown in FIG. 1, such as a power source (e.g., an integrated battery, a connection to an external power source, local memory storage, actuators, or some combination thereof).

The communication interface 142 enables input and output to the console 170. In some embodiments, the communication interface 142 is a single communication channel, such as USB. In other embodiments, the communication interface 142 includes several distinct communication channels operating together or independently. The one or more communication channels of the communication interface 142 can be implemented as wired or wireless connections.

The skin stretch sensors 144 include one or more hardware devices that record skin stretch information and/or provide haptic feedback and are described further in FIG. 3 through FIG. 7. As described in detail below, skin stretch information is information describing how much a user's skin stretches in response to an interaction with a physical object. The haptic feedback can cause skin stretch on a user wearing the haptic device 140 that would occur when the user interacts with a virtual object and/or virtual surface.

The locators 146 are objects located in specific positions on the haptic device 140 relative to one another and relative to a specific reference point on the haptic device 140. A locator 146 may be a light emitting diode (LED), a corner cube reflector, a reflective marker, a type of light source that contrasts with an environment in which the haptic device 140 operates, or some combination thereof. In embodiments where the locators 146 are active (e.g., a LED), the locators 146 may emit light in the visible band (~380 nm to 750 nm), in the infrared (IR) band (~750 nm to 1 mm), in the ultraviolet band (10 nm to 380 nm), some other portion of the electromagnetic spectrum, or some combination thereof.

In some embodiments, the locators 146 are located beneath an outer surface of the haptic device 140, which is transparent to the wavelengths of light emitted or reflected by the locators 146 or is thin enough not to substantially attenuate the wavelengths of light emitted or reflected by the locators 146. Additionally, in some embodiments, the outer surface or other portions of the haptic device 140 are opaque in the visible band of wavelengths of light. Thus, the locators 146 may emit light in the IR band under an outer surface that is transparent in the IR band but opaque in the visible band.

The IMU 148 is an electronic device that generates fast calibration data indicating an estimated position of the haptic device 140 relative to an initial position of the haptic device 140 based on measurement signals received from one or more of the position sensors 150. A position sensor 150 generates one or more measurement signals in response to motion of the haptic device 140. Examples of position sensors 150 include: one or more accelerometers, one or more gyroscopes, one or more magnetometers, another suitable type of sensor that detects motion, a type of sensor used for error correction of the IMU 148, or some combination thereof. The position sensors 150 may be located external to the IMU 148, internal to the IMU 148, or some combination thereof.

Based on the one or more measurement signals from one or more position sensors 150, the IMU 148 generates fast calibration data indicating an estimated position of the haptic device 140 relative to an initial position of the haptic device 140. For example, the position sensors 150 include multiple accelerometers to measure translational motion (e.g., forward/back, up/down, and left/right) and multiple gyroscopes to measure rotational motion (e.g., pitch, yaw, and roll). In some embodiments, the IMU 148 rapidly samples the measurement signals and calculates the estimated position of the haptic device 140 from the sampled data. For example, the IMU 148 integrates the measurement signals received from the accelerometers over time to estimate a velocity vector and integrates the velocity vector over time to determine an estimated position of a reference point on the haptic device 140. Alternatively, the IMU 148 provides the sampled measurement signals to the console 170, which determines the fast calibration data. The reference point is a point that may be used to describe the position of the haptic device 140. While the reference point may generally be defined as a point in space, in practice, the reference point is defined as a point within the haptic device 140 (e.g., a center of the IMU 148).

The IMU 148 receives one or more calibration parameters from the console 170. The one or more calibration parameters are used to maintain tracking of the haptic device 140. Based on a received calibration parameter, the IMU 148 may adjust one or more parameters (e.g., sample rate). In some embodiments, certain calibration parameters cause the IMU 148 to update an initial position of the reference point so it corresponds to a next calibrated position of the reference point. Updating the initial position of the reference point as the next calibrated position of the reference point helps reduce accumulated error associated with the determined estimated position. The accumulated error, also referred to as drift error, causes the estimated position of the reference point to "drift" away from the actual position of the reference point over time.

The console 170 is a computing device that executes applications 172 to process input data from the sensors 114 on the HMD 110 and haptic device 140 and provide output data for the electronic display 112 on the HMD 110 and for the skin stretch sensors 144 on the haptic device 140. The console 170 can be implemented as any kind of computing device, such as an integrated system-on-a-chip, a microcontroller, a desktop or laptop computer, a server computer, a tablet, a smart phone or other mobile device. Thus, the console 170 includes that includes components common to typical computing devices, such as a processor, random access memory, a storage device, a network interface, an I/O interface, and the like.

The processor may be or include one or more microprocessors or application specific integrated circuits (ASICs). The memory may be or include RAM, ROM, DRAM, SRAM and MRAM, and may include firmware, such as static data or fixed instructions, BIOS, system functions, configuration data, and other routines used during the operation of the computing device and the processor. The memory also provides a storage area for data and instructions associated with applications and data handled by the processor.

The storage device provides non-volatile, bulk or long term storage of data or instructions in the computing device. The storage device may take the form of a magnetic or solid state disk, tape, CD, DVD, or other reasonably high capacity addressable or serial storage medium. Multiple storage devices may be provided or available to the computing device. Some of these storage devices may be external to the computing device, such as network storage or cloud-based storage. The network interface includes an interface to a network and can be implemented as either wired or wireless interface. The I/O interface interfaces the processor to peripherals (not shown) such as, for example and depending upon the computing device, sensors, displays, cameras, color sensors, microphones, keyboards and USB devices.

In the example shown in FIG. 1, the console 170 further includes applications 172, a VR engine 174, an imaging device 176, and a skin stretch database 178. In some embodiments, the applications 172 and the VR engine 174 are implemented as software modules that are stored on the storage device and executed by the processor. Some embodiments of the console 170 include additional or different components than those described in conjunction with FIG. 1. Similarly, the functions further described below may be distributed among components of the console 170 in a different manner than is described here.

Each application 172 is a group of instructions that, when executed by a processor, generates VR content for presentation to the user. An application 172 may generate VR content in response to inputs received from the user via movement of the HMD 110 or the haptic device 140. Examples of applications 172 include gaming applications, conferencing applications, video playback applications, or other suitable applications.

In one embodiment, the VR engine 174 is a software module that allows applications 172 to operate in conjunction with the HMD 110 and haptic device 140. In some embodiments, the VR engine 174 receives information from sensors 114 on the HMD 110 and provides the information to an application 172. Based on the received information, the VR engine 174 determines media content to provide to the HMD 110 for presentation to the user via the electronic display 112 and/or haptic feedback to provide to the haptic device 140 to provide to the user via the skin stretch sensors 144. For example, if the VR engine 174 receives information from the sensors 114 on the HMD 110 indicating that the user has looked to the left, the VR engine 174 generates content for the HMD 110 that mirrors the user's movement in a VR environment.

Similarly, in some embodiments the VR engine 174 receives information from the sensors 144 on the haptic device 140 and provides the information to an application 172. The application 172 can use the information to perform an action within a virtual world of the application 172. For example, if the VR engine 174 receives information from the position sensors 150 indicating that the user has closed her fingers around a position corresponding to a virtual coffee mug in a VR environment and raises her hand to pick up the mug, a virtual hand in the application 172 picks up the virtual coffee mug and lifts it to a corresponding height. In another example, if the VR engine 174 receives information from the locators 146 on the haptic device 140 indicating that the user is touching sand on a beach in a VR environment, then the VR engine 174 generates content for the skin stretch sensors 144 to simulate skin stretch on the user's hand corresponding to skin stretch caused by touching sand in real life.

The VR engine 174 may also provide feedback to the user that the action was performed. The provided feedback may be visual via the electronic display 112 in the HMD 110 (e.g., displaying the simulated hand as it picks up and lifts the virtual coffee mug) or haptic feedback via the sensors 144 in the haptic device 140 (e.g., stretching the skin of a user's finger's to simulate the weight of picking up a solid coffee mug).

The imaging device 176 generates slow calibration data in accordance with calibration parameters from the console 170. Slow calibration data includes one or more images showing observed positions of the locators 146 that are detectable by the imaging device 176. The imaging device 176 may include one or more cameras, one or more video cameras, any other device capable of capturing images including one or more of the locators 146, or some combination thereof. Additionally, the imaging device 176 may include one or more filters (e.g., used to increase signal to noise ratio). The imaging device 176 is configured to detect light emitted or reflected from locators 146 in a field of view of the imaging device 176. In embodiments where the locators 146 include passive elements (e.g., a retroreflector), the imaging device 176 may include a light source that illuminates some or all of the locators 146, which retroreflect the light towards the light source in the imaging device 176. Slow calibration data is communicated from the imaging device 176 to the console 170, and the imaging device 176 receives one or more calibration parameters from the console 170 to adjust one or more imaging parameters (e.g., focal length, focus, frame rate, ISO, sensor temperature, shutter speed, aperture, etc.).

In one embodiment, the skin stretch database 178 is a computer store for storing skin stretch information received from the haptic device 140, the console 170, the HMD 110, or some combination thereof. The skin stretch database 178 stores mappings between the received information (e.g., associating skin stretch information from the haptic device 140 with information from the console 170 describing a physical object that generated the skin stretch information). Further, the skin stretch database 178 may provide skin stretch information to other components of the console 170 (e.g., the applications 172) for processing. In some embodiments, the skin stretch database 178 may communicate via a network connection to a server inside or outside the VR system 100. For instance, the skin stretch database 178 may upload skin stretch information to a server that includes a database aggregating skin stretch information from multiple haptic devices 140, other devices, and/or user inputs. Additionally, the skin stretch database 178 may download skin stretch information from the server. In other embodiments, the skin stretch database 178 may also be implemented on the haptic device 140 and/or another component in the VR system 100.

Skin Stretch Instrument

Figure 2:
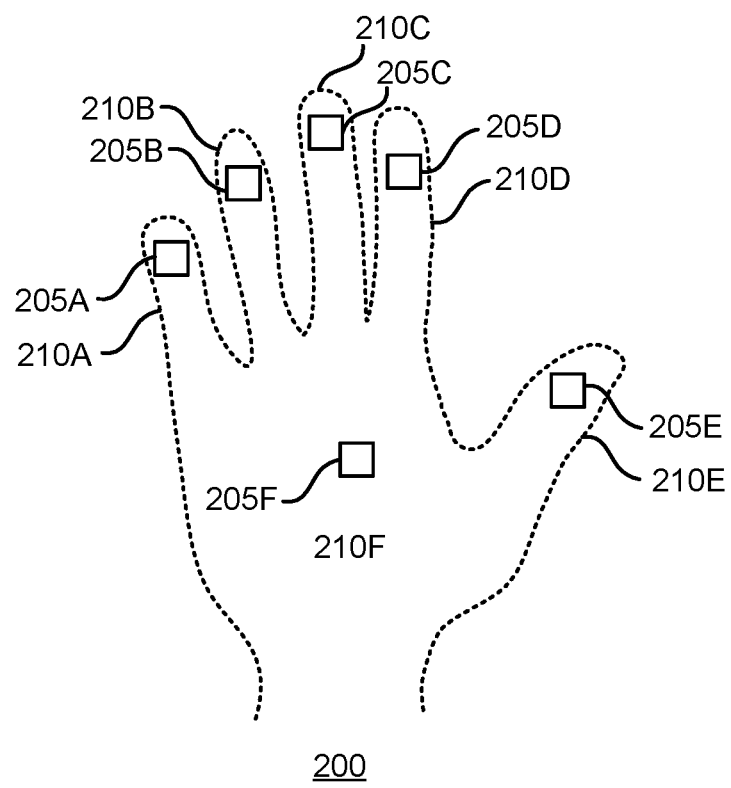
FIG. 2 illustrates a haptic glove comprising skin stretch sensors on a user's hand, in accordance with an embodiment.

FIG. 2 illustrates a haptic glove (i.e., haptic device 140) comprising a system 200 of skin stretch sensors 205 configured to be worn on a user's hand, in accordance with an embodiment. In the example embodiment shown in FIG. 2, the haptic device 140 comprises six skin stretch sensors 205 (i.e., 205A, 205B, 205C, 205D, 205E, and 205F), each worn near the tip of one of the fingers 210 (i.e., 210A, 210B, 210C, 210D, 210E) or palm (i.e., 210F) of the user's hand. In other embodiments, the system 200 may include fewer or more skin stretch sensors, and the skin stretch sensors may be worn on different locations on the user's hand, fingers, and/or palm. Additionally, in some embodiments, the skin stretch sensors 205 may not be part of a glove, but directly affixed to portions of the user (e.g., to a finger via, e.g., a strap).

The skin stretch sensors 205 may be configured as skin stretch calibration sensors (further described in FIG. 4 and FIG. 5) that record skin stretch information of a user while the user is interacting with real surfaces. Real surfaces are surfaces that users can physically interact with in the real world. Real surfaces may be surfaces of real objects, i.e., objects that users can physically interact with in the real world. Skin stretch is the amount of the user's skin that physical stretches when the user's skin interacts with a real surface in the real world. For instance, when a user picks up a basketball (i.e., a real object) with her fingers, the weight of the basketball and the friction between the surface of the basketball (i.e., a real surface) and the user's fingers causes the skin on the user's finger to stretch a certain amount; heavier real objects may cause more skin stretch than real objects with lighter weight. In other embodiments, the skin stretch sensors 205 may be configured to simulate skin stretch (further described in FIG. 6) on a user's finger in the real world when the user is interacting with virtual surfaces and/or virtual objects in the VR system 100. Unlike with real surfaces and real objects, users cannot physically interact with virtual surfaces and virtual objects in the real world. Rather, users interact with virtual surfaces and virtual objects via a VR system (e.g., the VR system 100) that simulates the virtual surfaces and/or objects (e.g., using the console 170, HMD 110, and haptic device 140). For instance, the user can view a virtual flower (i.e., a virtual object) in a VR system and touch the surface of the virtual flower's petals (i.e., a virtual surface).

Figure 3:
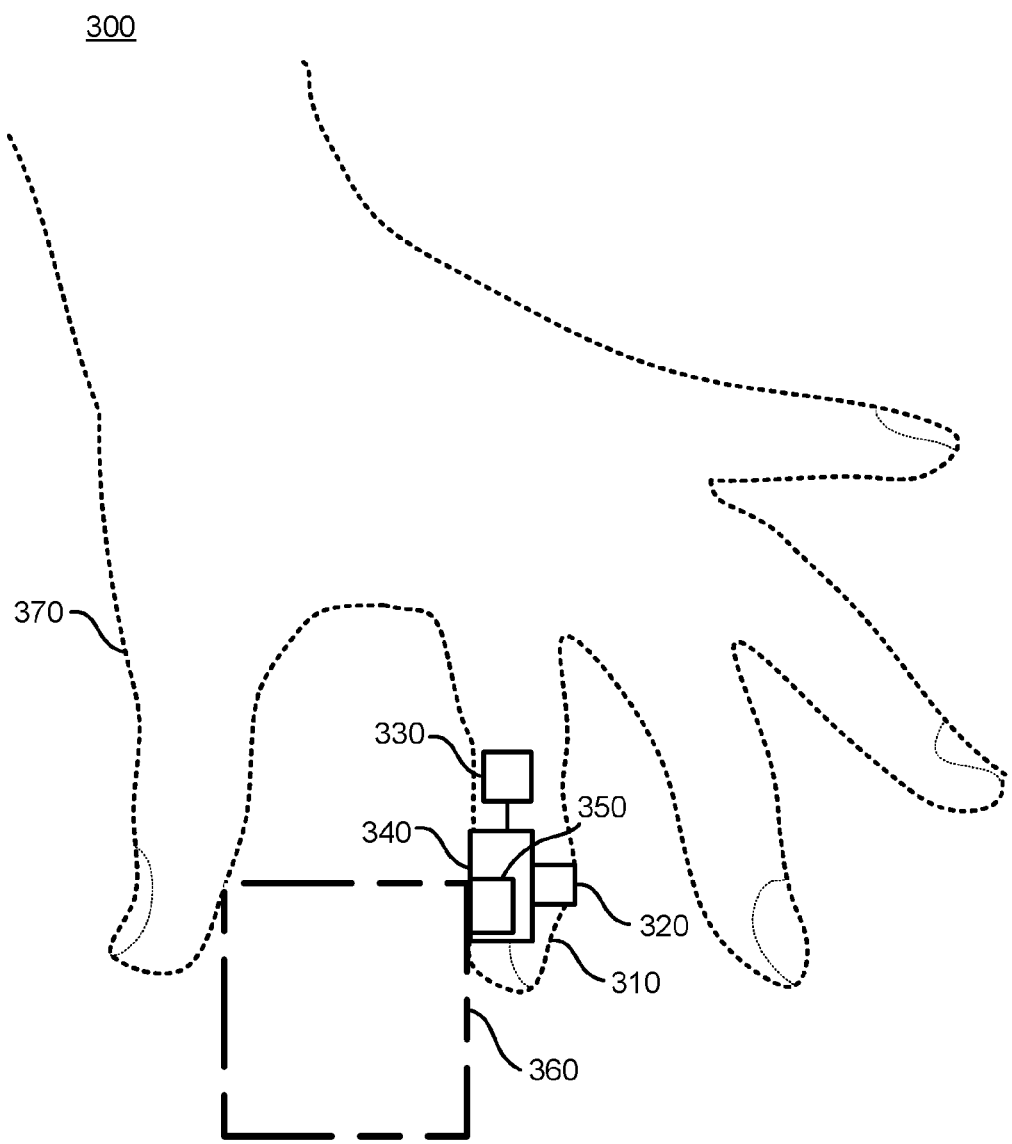
FIG. 3 illustrates a skin stretch calibration sensor on a user's finger, in accordance with an embodiment.

FIG. 3 illustrates a skin stretch calibration sensor 300 on a user's finger 310, in accordance with an embodiment. In other embodiments, additional calibration sensors 300 may be worn by the user (e.g., additional calibration sensors 300 for one or more fingers and/or the palm of the user). The skin stretch calibration sensor 300 shown in FIG. 3 comprises a strap 320, a controller 330, a mechanical housing 340, and a skin stretch mechanism 350. In this example embodiment, the skin stretch calibration sensor 300 is worn on finger 310 of a user's hand, and the user is picking up a real object 360 using a finger 310 and a thumb 370. When picking up the real object 360, at least the skin stretch mechanism 350 and the thumb 370 are in contact with the real object 360. The skin stretch mechanism 350 is coupled to the mechanical housing 340. The controller 330 is coupled to the mechanical housing 340, for example, through a mechanical link and/or electrical wire, facilitating communication of information between the controller 330, mechanical housing 340, and skin stretch mechanism 350.

In one embodiment, the strap 320 is a plastic strap physically attached to the mechanical housing 340 that secures the skin stretch calibration sensor 300 to the user's finger 310. In alternate embodiments, the strap 320 is made of other standard structural material such as metal, alloys, composites, wood, VELCRO, and the like. In some embodiments, the mechanical housing 340 may be coupled to a garment worn on the user's hand and/or finger; in these cases, the strap 320 is optional.

In one embodiment, controller 330 is a microcontroller or computer system that records skin stretch information. In one example use case, a user wearing the skin stretch calibration sensor 300 provides user input via the console 170 to indicate a haptic instruction, e.g., indicating a type of real object and/or real surface that the user is going to interact with and/or the type of interaction. For instance, the user may use a computer mouse to select a button on a computer display of the console 170 indicating that the user picked up a Corgi puppy dog. In another embodiment, the user can select a predetermined routine in which the user is instructed to interact with a sequence of different real objects/and or real surfaces. For instance, the user may be instructed to pick up balls of increasing weights (e.g., ¼ lb, ½ lb, 1 lb, . . . ). Since the sequence is predetermined (e.g., the order of the weights in this instance), the user does not have to provide user input before interacting with each different real object, which may be advantageous because the user can save time and it is more convenient for the user.

After providing the user input, the user performs the interaction with the skin stretch calibration sensor 300. Continuing with the previous example use case of a user picking up the Corgi puppy dog, the controller records information from the skin stretch mechanism 350 and/or the skin stretch calibration sensor 300 and stores the recorded information with a mapping to the user input. The recorded information and mappings are stored as skin stretch information to local memory on the haptic device 140 and/or transmitted to the console 170, via a communication interface (e.g., a communication interface 142), for storage on a console (e.g., in the skin stretch database 178 of the console 170) and/or a computing server connected to the console 170 over the internet or another network connection. Over time, a VR system (e.g., the VR system 100) can build up a collection of recorded information and mappings between the recorded information and different types of real objects and real surfaces. For example, the VR system 100 can generate, in the skin stretch database 178, a database of skin stretch calibration information mapped to interactions with various fruits including mangos, peaches, grapes, and strawberries.

In one embodiment, the mechanical housing 340 houses the skin stretch mechanism 350 and is made of plastic material. In alternate embodiments, the mechanical housing 340 is made of other standard structural material such as metal, alloys, composites, wood, Velcro, and the like. The surface of the mechanical housing 340 may be transparent or partially transparent such that the skin stretch mechanism 350 is visible from outside the mechanical housing 340. In other embodiments, the surface of the mechanical housing 340 is opaque such that the skin stretch mechanism 350 is not visible from outside the mechanical housing 340.

In one embodiment, the skin stretch mechanism 350 (further described in FIG. 4 through FIG. 7) includes one or more bearings. Bearings may be gears that rotate around a single axis of rotation or spherical gears that rotate around multiple axes of rotation. The skin stretch mechanism 350 may comprise different types of gears such as spur gears, rack and pinion, internal ring gears, helical gears, worm gears, bevel gears, and the like. In skin stretch mechanisms 350 with more than one bearing, the more than one bearing may have different gear ratios.

Skin Stretch Mechanisms

Figure 4:
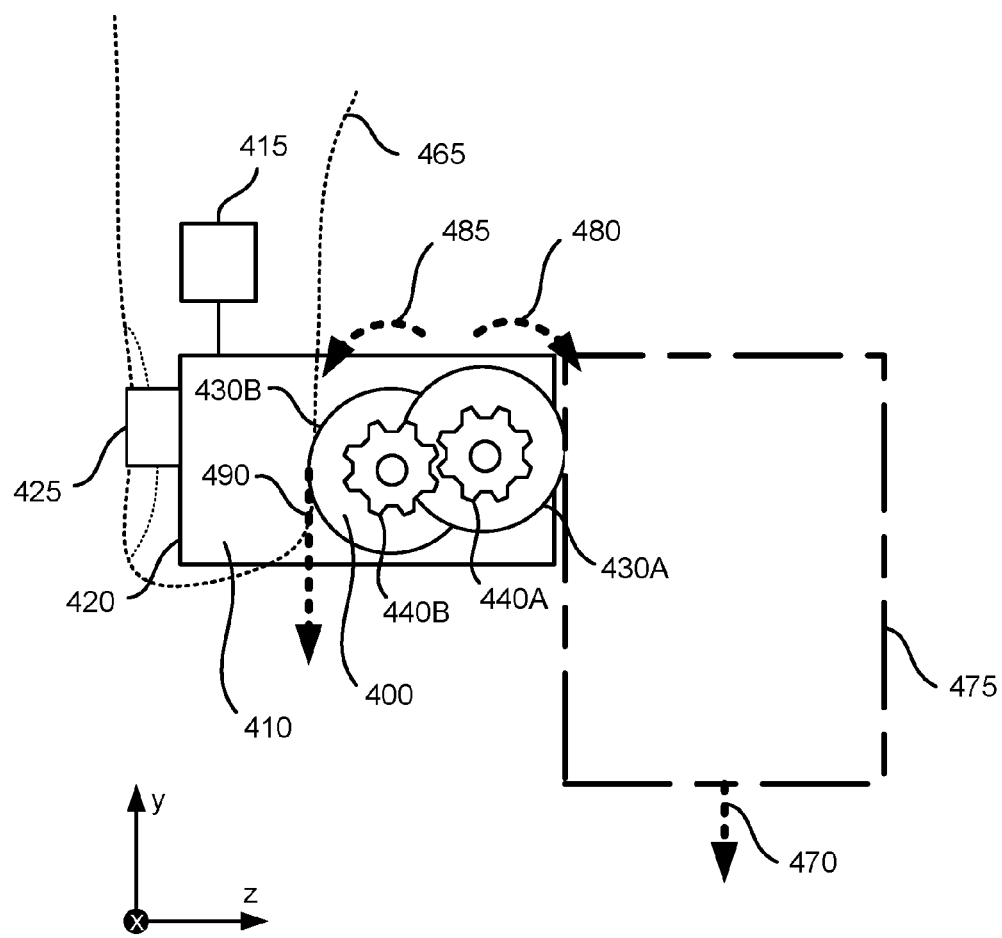
FIG. 4 illustrates a skin stretch mechanism in a skin stretch sensor, in accordance with an embodiment.

FIG. 4 illustrates a skin stretch mechanism 400 in a skin stretch calibration sensor 410, in accordance with an embodiment. In some embodiments, the skin stretch mechanism 400 is an embodiment of the skin stretch mechanism 350 of the skin stretch calibration sensor 300 in FIG. 3. In alternate embodiments, the skin stretch mechanism 400 is part of another system that records skin stretch caused by real objects and/or real surfaces, and/or causes skin stretch in response to interactions with virtual objects and/or virtual surfaces.

The skin stretch calibration sensor 410 shown in FIG. 4 comprises a skin stretch mechanism 400, a controller 415, a mechanical housing 420, and a strap 425. The controller 415, mechanical housing 420, and strap 425 are substantially the same as the controller 330, mechanical housing 340, and strap 320, respectively. In one example embodiment, the skin stretch mechanism 400 comprises an outer roller 430A, an inner roller 430B, an outer gear 440A, and an inner gear 440B.

The outer roller 430A is coupled to a shaft and rotates about an axis of rotation centered on the shaft. In FIG. 4, the axis of rotation is parallel to the x-axis; however, in alternate embodiments, the outer roller 430A may be positioned such that the axis of rotation may be parallel to the y-axis or z-axis. The outer roller 430A contacts real objects and/or real surfaces that the user interacts with. The width of the outer roller 430A may be shorter than the width of the contacted real objects and/or real surfaces. A surface of the outer roller 430 may be selected to have a coefficient of friction similar to that of a human finger.

In one embodiment, inner roller 430B is coupled to a shaft and rotates about an axis of rotation centered on the shaft, where the axis of rotation of the inner roller 430B is different than the axis of rotation of the outer roller 430A. In FIG. 4, the axis of rotation is parallel to the x-axis; however, in alternate embodiments, the outer roller 430A may be positioned such that the axis of rotation may be parallel to the y-axis or z-axis. The inner roller 430B contacts the skin of the user, e.g., the skin of finger 465, which is wearing the skin stretch calibration sensor 410. The inner roller 430B may include or be coupled to a feedback surface with a surface texture similar to that of the physical object. A feedback surface is a surface that has a surface texture similar to that of the physical object. For example, if a user touches a virtual apple, the feedback surface may be used to make it feel as if the user is touching a real apple. Different feedback surfaces may have, e.g., different coefficients of friction, differing levels of smoothness/roughness, thermal conductivity, some other texture related traits, or some combination thereof.

In one embodiment, the outer gear 440A is coupled to the outer roller 430A such that the outer gear 440A and the outer roller 430A rotate together about the same axis of rotation. In one embodiment, the radius of the outer gear 440A is smaller than the radius of the outer roller 430A, which allows the skin stretch mechanism 400 to be more compact in size.

In one embodiment, the inner gear 440B is coupled to the inner roller 430B such that the inner gear 440B and the inner roller 430B rotate together about the same axis of rotation. In one embodiment, the radius of the inner gear 440B is smaller than the radius of the inner roller 430B, which allows the skin stretch mechanism 400 to be more compact in size.

The outer gear 440A and inner gear 440B are engaged such that rotating the outer gear 440A causes the inner gear 440B to rotate in the opposite direction, and vice-versa. For example, rotating the outer gear 440A clockwise causes the inner gear 440B to rotate counterclockwise. In FIG. 4, outer gear 440A and inner gear 440B are shown to be the same size and to have the same number of gear teeth, and thus they have a 1-to-1 gear ratio, i.e., the input angular speed of the outer gear 440A is equal to the output angular speed of the inner gear 440B. For example, rotating the outer gear 440A at a speed of one revolution per minute causes the inner gear 440B to rotate at a speed of one revolution per minute as well, but in the opposite direction. In other embodiments, the skin stretch mechanism 400 may comprise two or more gears with gear ratios and/or compound gear ratios different than 1-to-1 (i.e., a gear ratio that does not equal one). For example, in a skin stretch mechanism 400 comprising an outer gear 440A and an inner gear 440B with a corresponding gear ratio of 2 (i.e., 2-to-1 or 2:1), rotating the outer gear 440A at a speed of one revolution per minute causes the inner gear 430A to rotate at a speed of two revolutions per minute, but in the opposite direction.

In one embodiment, the outer gear 440A, inner gear 440B, outer roller 430A, inner roller 430B, and the roller shafts are components made from metal; however, these components can also be made using a natural or synthetic plastic, an alloy, and other manufacturing materials known to one skilled in the art.

In the example embodiment shown in FIG. 4, gravity applies a first force 470 in the negative y-axis direction on the real object 475 being picked up by a user with at least the user's finger 465 wearing skin stretch calibration sensor 410. In response to the first force 470, a first rotational force 480 in the clockwise direction is applied to the outer roller 430A (and coupled outer gear 440A) in contact with the object 475. Since the outer gear 430A is engaged with the inner gear 440B, a second rotational force 485 in the counter clockwise direction is applied to the inner roller 430B (and coupled inner gear 440B). Finally, the inner roller 430B, which is in contact with the user's finger 465, applies a second force 490 in the negative y-axis direction to the skin of the user's finger 465 corresponding to the first force 470. Accordingly, the second force 490 simulates (i.e., within the VR system 100) the first force 470 such that the user experiences skin stretch on the user's finger 465 associated with picking up the object 475 even though the user's finger 465 is not directly in contact with the object 475. Rather, the user's finger 465 is indirectly in contact with the object 475 via the skin stretch sensor 410.

The controller 415 records information about the outer gear 440A, outer roller 430A, inner gear 440B, and inner roller 430B such as the angular speed of the rotations, the number of rotations, and the like. The recorded information may be mapped to the object 470 to generate corresponding skin stretch information. As discussed above, skin stretch information is information describing how much a user's skin stretches in response to an interaction with a physical object. Skin stretch information may include, e.g., a number of rotations for a duration of time of the outer gear 440A, the inner gear 440B, the outer roller 430A, the inner roller 430B, or some combination thereof. Skin stretch information may also include an angular speed of rotation of the outer gear 440A, the inner gear 440B, the outer roller 430A, the inner roller 430B, or some combination thereof. Skin stretch information may also include a direction of rotation of the outer gear 440A, the inner gear 440B, the outer roller 430A, the inner roller 430B, or some combination thereof. Skin stretch information may also include a type of feedback surface of the outer roller 430A, the inner roller 430B, or some combination thereof.

In other embodiments, the force applied to the user's finger may be in a direction different than in the negative y-axis direction, depending on the interaction between the finger 465 and the object 475. For instance, if the finger 465 was pressing along the side of the object 475 in the negative y-axis direction, then the resulting force applied to the finger 465 would be in the positive y-axis direction.

Figure 5:
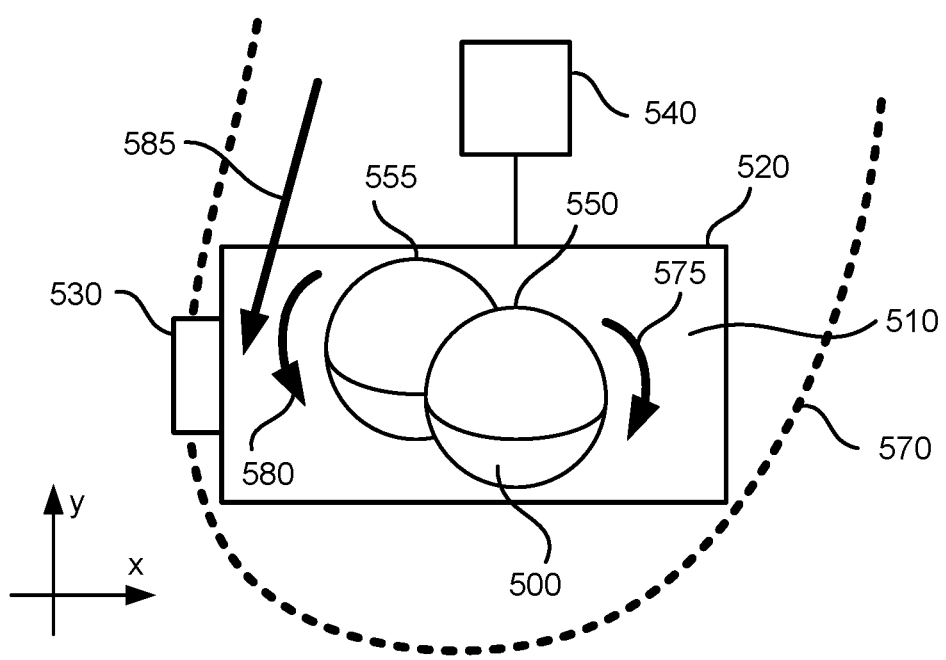
FIG. 5 illustrates another skin stretch mechanism in a skin stretch sensor, in accordance with an embodiment.

FIG. 5 illustrates another skin stretch mechanism 500 in a skin stretch calibration sensor 510, in accordance with an embodiment. In some embodiments, the skin stretch mechanism 500 is an embodiment of the skin stretch mechanism 350 of the skin stretch calibration sensor 300 in FIG. 3. In alternate embodiments, the skin stretch mechanism 500 is part of another system that records skin stretch caused by real objects and/or real surfaces, and/or causes skin stretch in response to interactions with virtual objects and/or virtual surfaces.

The skin stretch calibration sensor 510 shown in FIG. 5 comprises a skin stretch mechanism 500, a mechanical housing 520, a strap 530, and a controller 540. The controller 540, mechanical housing 520, and strap 430 are substantially the same as the controller 330, mechanical housing 340, and strap 320, respectively, in FIG. 3. In one embodiment, the skin stretch mechanism 510 comprises an outer spherical bearing 550 and an inner spherical bearing 555.

In one embodiment, the outer spherical bearing 550 is suspended in the skin stretch mechanism 500 such that the outer spherical bearing 550 may rotate in two or more axis of rotation (e.g., a first axis of rotation parallel to the x-axis and a second axis of rotation parallel to the y-axis). Thus, in terms of degrees of motion, spherical bearings may have an advantage over typical gears (e.g., spur gears) that rotate along only one axis (e.g., the outer gear 440A and inner gear 440B in the skin stretch mechanism 400 shown in FIG. 4).

In one embodiment, the inner spherical bearing 555 is suspended in the skin stretch mechanism 500 such that the inner spherical bearing 555 may rotate in two or more axis of rotation different than the two or more axis of rotation of the outer spherical bearing 550 (e.g., a first axis of rotation parallel to the x-axis and a second axis of rotation parallel to the y-axis). The outer spherical bearing 550 is in contact with the inner spherical bearing 555 such that rotating the outer spherical bearing 550 in one direction causes the inner spherical bearing 555 to rotate in the opposite direction. For example, rotating the outer spherical bearing 550 clockwise about the x-axis causes the inner spherical bearing 555 to rotate counter clockwise about the x-axis. In another example, rotating the outer spherical bearing 550 clockwise about the y-axis causes the inner spherical bearing 555 to rotate counter clockwise about the y-axis.

In an example use case, a user is picking up a real object using at least finger 570 wearing the skin stretch calibration sensor 510, the real object contacts the outer bearing 550 and applies a corresponding first rotational force 575 to the outer spherical bearing 550. Consequently, since the outer spherical bearing 550 rotates with the inner spherical bearing 555, a corresponding second rotational force 580 is applied to the inner spherical bearing 555. The inner spherical bearing 555 is in contact with the user's finger 570 such that the second rotational force 580 causes a third force 585 to be applied to the skin of the finger. Accordingly, the third force 585 simulates (i.e., within the VR system 100) skin stretch on the user's finger 570 associated with picking up an real object even though the user's finger 570 may not be directly in contact with the real object. In the skin stretch mechanism 500 shown in FIG. 5, the outer spherical bearing 550 and the inner spherical bearing 555 are the same size such that rotating the outer spherical bearing 550 at an angular speed causes the inner spherical bearing 555 to rotate at the same angular speed in the opposite direction. However, in other embodiments, the outer spherical bearing 550 may have a different size than the inner spherical bearing 555 such that the ratio of the angular speed of the outer spherical bearing 550 to the angular speed of the inner spherical bearing 555 is different than one. Other embodiments of the skin stretch mechanism 500 may include more than two spherical bearings, and any combination of the more than two spherical bearings may be in contact with each other. In some embodiments, the inner spherical bearing 555 may include a feedback surface with a surface texture similar to that of the physical object. In some embodiments, the outer spherical bearing 550 may have a surface texture similar to that of a human finger.

The controller 540 may record information independently from the outer spherical bearing 550 and the inner spherical bearing 555 and/or simultaneously from both spherical bearings. By recording independently, the controller 540 may determine if there is slipping between the outer spherical bearing 550 and inner spherical bearing 555 based on a difference in the expected and actual values of the number and/or rate of rotations of the spherical bearings.

Figure 6:
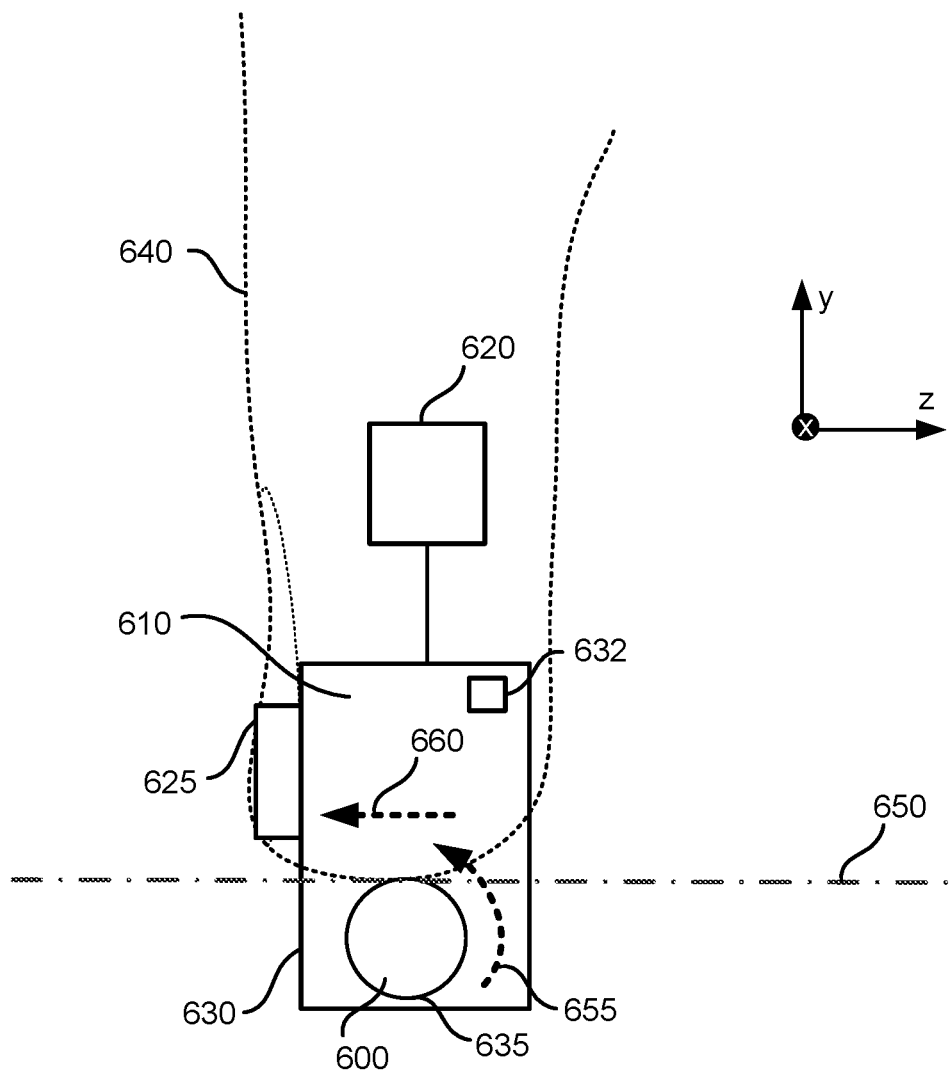
FIG. 6 illustrates a skin stretch mechanism in a skin stretch sensor that simulates skin stretch on a user's finger, in accordance with an embodiment.

FIG. 6 illustrates a skin stretch mechanism 600 in a skin stretch sensor 610 that simulates skin stretch on a user's finger 640, in accordance with an embodiment. In some embodiments, the skin stretch mechanism 600 is an embodiment of the skin stretch mechanism 350 in FIG. 3. In alternate embodiments, the skin stretch mechanism 600 is part of another system that causes skin stretch in response to interactions with virtual objects and/or real surfaces, and/or causes skin stretch in response to interactions with virtual objects and/or virtual surfaces.

The skin stretch sensor 610 shown in FIG. 6 comprises a skin stretch mechanism 600, a controller 620, a strap 625, a mechanical housing 630, and rotation sensors 632. The controller 620, mechanical housing 630, and strap 625 are substantially the same as the controller 330, mechanical housing 340, and strap 320, respectively. In one example embodiment, the skin stretch mechanism 610 comprises a roller 635, which is substantially the same as the inner roller 430B in FIG. 4.

In one embodiment, in addition to recording information from the skin stretch sensor 610, the controller 620 may provide instructions to the skin stretch sensor 610 to rotate the roller 635. For example, the instruction may be an electronic control signal received by a speed controller device of the skin stretch sensor 610 which controls an actuator (e.g., electric motor), powered by a power source (e.g., 3.7V rechargeable lithium-ion battery pack), that rotates the roller 635. Implementing the speed controller, actuator, and power source in this example are known to one skilled in the art, and thus not illustrated in FIG. 6 for clarity purposes. The instruction may be received from the console 170 via the communication interface 142 and/or from local memory on the haptic device 140. Further, the instruction may be based on previously recorded information, e.g., the skin stretch database 178 of skin stretch calibration information mapped to various fruits including mangos, peaches, grapes, and strawberries described in FIG. 3. In this example, the instruction received may include different information (e.g., a number of rotations to rotate the roller 635 or an angular speed to rotate the roller 635) depending on the particular fruit that the instruction is associated with. The previously recorded information may be aggregated from a plurality of controllers (e.g., controllers from multiple haptic devices 140 used by a population of users).

In one embodiment, one or more rotation sensors 632 measures data from the skin stretch sensor 610. For example, an optical encoder rotation sensor 632 may measure an amount of rotation that the roller 635 has undergone during a certain period of time. This information may be used by the controller 620 to implement a closed-loop control system of the roller 635. In different example, a potentiometer rotation sensor 632 may also be used to measure the number of revolutions of the roller 635. The information measured by the rotation sensors 632 may be saved by the controller 620 on local memory on the haptic device 140 and/or transmitted to the console 170 via the communication interface 142 for storage in the skin stretch database 178 and/or another database.

In an example use case, a user moves her finger 640 wearing the skin stretch sensor 610 in the positive z-axis direction to interact with a virtual surface 650 within the VR system 100. As the finger 640 contacts the VR surface 650 and while the finger 640 is interacting with the VR surface 650, the controller 620 receives an instruction to rotate the roller 610 in the counterclockwise direction, corresponding to rotational force 655. The roller 635 is in contact with the tip of the user's finger 640 such that the rotational force 655 applies a corresponding force 660 in the negative z-axis direction that causes skin stretch at the tip of the finger 640. Thus, the force 660 simulates, within the VR system 100, the skin stretch that the user would have been experienced if the user interacted with a real surface corresponding to the virtual surface 650 (e.g., the real surface having similar surface properties as the virtual surface 650). In alternate embodiments, the skin stretch may be caused in other directions such as the y-axis and the x-axis. In some embodiments, the roller 635 may include a feedback surface with a surface texture similar to that of the virtual surface 650.

In another embodiment, the skin stretch mechanism 600 comprises multiple rollers, gears, spherical bearings, and/or the like. A skin stretch mechanism 600 may comprise multiple rollers with different types of surface material (i.e., rollers with different feedback surfaces). This enables the skin stretch sensor 610 to cause (i.e., simulate within the VR system 100) different types of skin stretch and physical sensations that correspond to interacting with different surface properties (e.g. real surfaces of different types of real objects). For example, a roller with a smooth plastic surface may simulate the skin stretch experienced when picking up a virtual apple (i.e., a virtual object) with a smooth skin (i.e., a virtual surface) within the VR system 100. In contrast in another example, a roller with a rough surface may simulate the skin stretch experienced when picking up a virtual rock (i.e., a virtual object) with a rough surface (i.e., a virtual surface) within the VR system 100.

Figure 7:
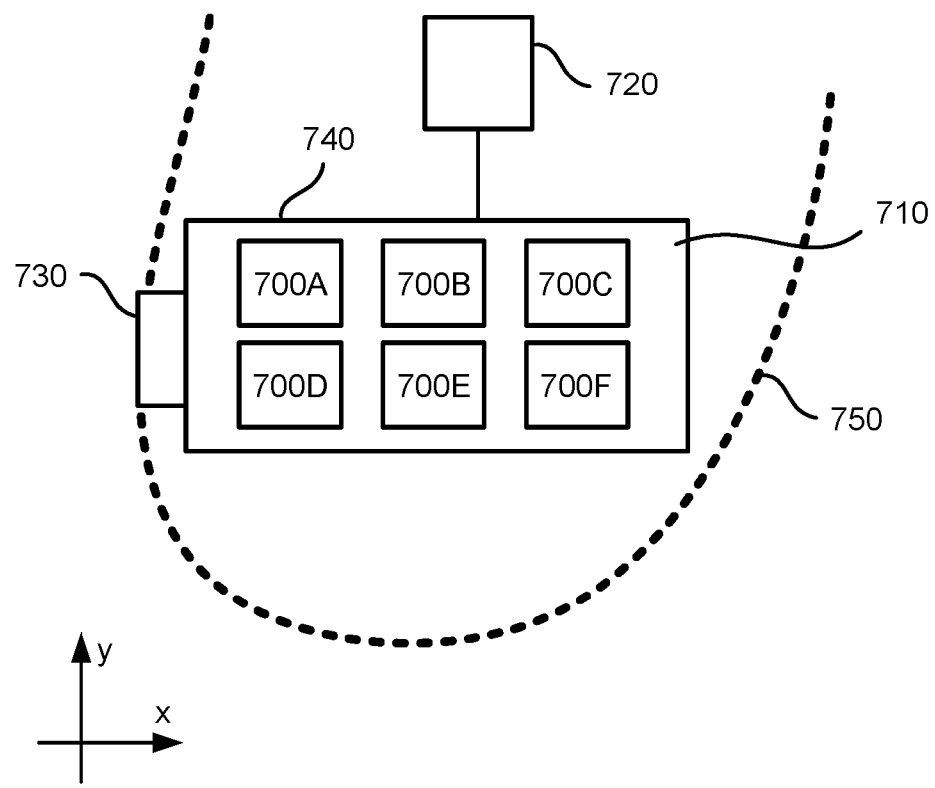
FIG. 7 illustrates an array of multiple skin stretch mechanisms in a skin stretch sensor, in accordance with an embodiment.

FIG. 7 illustrates an array of multiple skin stretch mechanisms 700 in a skin stretch sensor 710, in accordance with an embodiment. In some embodiments, the skin stretch mechanisms 700 are embodiments of the skin stretch mechanism 350 of the skin stretch calibration sensor 300 in FIG. 3. In other embodiments, the skin stretch mechanisms 700 are embodiments of the skin stretch mechanism 600 of the skin stretch sensor 610 in FIG. 6. Further, in alternate embodiments, the skin stretch mechanisms 700 are part of another system that records skin stretch caused by real objects and/or real surfaces, and/or causes skin stretch in response to interactions with virtual objects and/or virtual surfaces.

The skin stretch sensor 710 shown in FIG. 7 comprises an array of skin stretch mechanisms 700, i.e., 700A, 700B, 700C, 700D, 700E, and 700F, a controller 720, a strap 730, and a mechanical housing 740. The controller 720, mechanical housing 740, and strap 730 are substantially the same as the controller 330, mechanical housing 340, and strap 320, respectively, in FIG. 3. The skin stretch mechanisms 700 are substantially the same as the skin stretch mechanism 400 in FIG. 4, the skin stretch mechanism 500 in FIG. 5, or the skin stretch mechanism 600 in FIG. 6.

In this example embodiment, the skin stretch sensor 710 is worn on finger 750 of a user's hand. FIG. 7 shows the six skin stretch mechanisms 700A through 700F are configured in an array of two rows in the x-axis direction and three columns in the y-axis direction. In other embodiments, the skin stretch sensor 710 may comprise any number of one or more skin stretch mechanisms 700 configured in an array of one or more rows and one or more columns. Further, the one or more skin stretch mechanisms 700 may be configured in arrangements besides rectangular arrays. For example, the skin stretch mechanisms may 700 be configured in the shape of a circle or triangle, randomly, in a checkerboard pattern, or in other arrangements.

Compared to a skin stretch sensor with only one skin stretch mechanism (e.g., skin stretch sensor 410 with skin stretch mechanism 400 shown in FIG. 4), an array of one or more skin stretch mechanisms may provide more contact, as measured by contacted surface area, between the skin stretch mechanisms 700 (e.g., the array of skin stretch mechanisms 700A through 700F) and the user's finger (e.g., finger 750) without having to increase the size of the skin stretch mechanisms 700 (e.g., radius of a gear and/or roller of a skin stretch mechanism). Additionally, by decreasing the size of the skin stretch mechanisms 700 (e.g., decreasing the radius of the roller and/or gear of a skin stretch mechanism), the distance decreases between the user's finger (e.g., finger 750) and a real object that the user is interacting with (e.g., real object 475 in FIG. 4). This is advantageous because the user is able to interact with the real object using the haptic device 140 in an interaction that more closely resembles an interaction with the real object in real life without using the haptic device 140.

The information about the array of skin stretch mechanisms 700 recorded by the controller 720 may be transmitted to the console 170 via the communication interface 142 either independently for one or more skin stretch mechanisms 700 or together simultaneously. The number, size, type, and orientation of gears and/or rollers of each skin stretch mechanism 700 may be the same or differ between all skin stretch mechanisms 700 in a skin stretch sensor 710. Further, the gear ratio and/or compound gear ratio may be the same or differ between skin stretch mechanisms 700 in a skin stretch sensor 710.

Figure 8A:
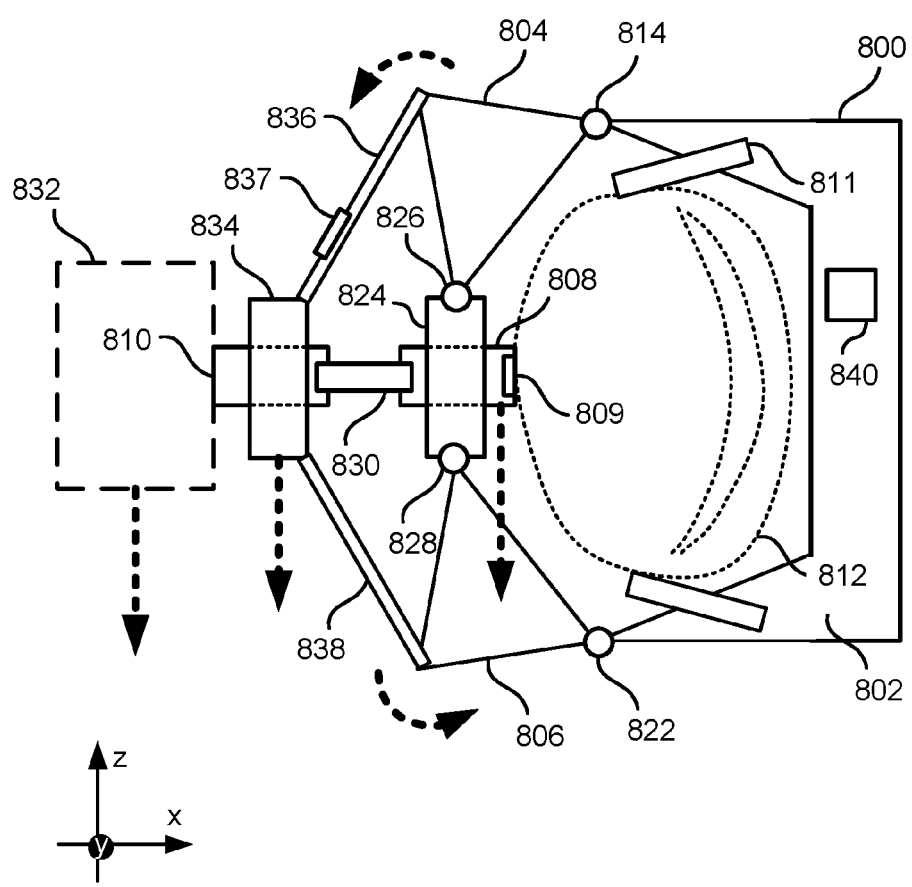
FIG. 8A illustrates yet another skin stretch mechanism, in accordance with an embodiment.

FIG. 8A illustrates yet another skin stretch mechanism 800, in accordance with an embodiment. In some embodiments, the skin stretch mechanism 800 is an embodiment of the skin stretch mechanism 350 of the skin stretch calibration sensor 300 in FIG. 3. In alternate embodiments, the skin stretch mechanism 800 is part of another system that records skin stretch caused by real objects and/or real surfaces, and/or causes skin stretch in response to interactions with virtual objects and/or virtual surfaces. The skin stretch mechanism 800 shown in FIG. 8A comprises a base 802, a first arm 804, a second arm 806, an inner bearing 808, and an outer bearing 810, among other components. The skin stretch mechanism 800 shown in FIG. 8A is not necessarily to scale, and components of the skin stretch mechanism 800 have been enlarged for purposes of clarity.

The base 802 holds the skin stretch mechanism 800 in a position around a finger 812 of a user. In some embodiments, the base 802 includes one or more structural segments 811 that help maintain the position of the skin stretch mechanism 800 around the finger 812. The structural segments may include a ratcheting and/or lockable component to assist in maintaining the position.

In one embodiment, the first arm 804 is coupled to the base 802 at a first joint 814. The first joint 814 allows the first arm 804 to rotate about one or more axes, while the base 802 maintains a stationary, or almost stationary, position. For example, the first joint 814 is a mortise-type hinge that allows the first arm 804 to rotate about an axis parallel to the y-axis. In another example, the first joint 814 includes a ball bearing allowing the first arm 804 to rotate about an axis parallel to the x-axis, an axis parallel to the z-axis, some other axis, or some combination thereof.

In one embodiment, the second arm 806 is coupled to the base 802 at a second joint 822. The second joint 822 allows the second arm 806 to rotate about one or more axes, while the base 802 maintains a stationary, or almost stationary, position. For example, the second joint 822 is a mortise-type hinge that allows the second arm 806 to rotate about an axis parallel to the y-axis. In another example, the second joint 814 includes a ball bearing allowing the first arm 804 to rotate along an axis parallel to the x-axis, an axis parallel to the z-axis, among other axis.

In one embodiment, the inner bearing 808 is in contact with the finger 812 of the user. The inner bearing 808 is, e.g., a pin. The inner bearing 808 includes a pressure sensor 809 that records normal forces experienced by a user when using the skin stretch mechanism 800 to interact with a real object or a real surface. The inner bearing 808 is coupled to an inner collar 824. The inner collar 824 is coupled to the first arm 804 at a third joint 826 and coupled to the second arm 806 at a fourth joint 828. The third joint 826 and the fourth joint 828 are substantially the same as the first joint 814 and the second joint 822. In some embodiments, all four joints rotate about axes parallel to each other, e.g., the axes are all parallel to the y-axis. In some embodiments, the inner bearing 808 may include a feedback surface with a surface texture similar to that of a physical object. In some embodiments, the inner bearing 808 may have a surface texture similar to that of a human finger.

In one embodiment, the inner bearing 808 is coupled to the outer bearing 810 by a cable 830. The cable 830 is a rigid or semi-rigid cable such that movement of one of the two bearings (i.e., the inner bearing 808 and the outer bearing 810) causes a corresponding movement in the other bearing. In an embodiment, the cable 830 transfers only a force normal to a surface of the finger 812 in contact with the inner bearing 808. For example, the x-axis is normal to the surface of the finger 812. The outer bearing 810 moves in response to contact with a real object or surface, e.g., the real object 832. The movement of the outer bearing 810 includes translation and/or rotation about one or more axis, including translation along an axis parallel to the x-axis. In response to the movement of the outer bearing 810, the inner bearing 808 also moves, i.e., translates along the axis parallel to the x-axis.

In one embodiment, the outer bearing 810 is coupled to an outer collar 834. The outer collar 834 is coupled to the first arm 804 by a first rigid member 836 and coupled to the second arm 806 by a second rigid member 838. The first rigid member 836 is coupled to the outer collar 834 and the first arm 804 at a hinge at each end of the first rigid member 836. Similarly, the second rigid member 838 is coupled to the outer collar 834 and the second arm 806 at a hinge at each end of the second rigid member 838. The first rigid member 836 and the second rigid member 838 are two-force members, i.e., the first rigid member 836 and the second rigid member 838 each can only have two forces acting upon the line at the hinges of the member. Further, if a two-force member is in equilibrium, the two forces are equal in magnitude and co-linear. Accordingly, the first rigid member 836 and the second rigid member 838 transfer shear force from the outer bearing 810 to the inner bearing 808. For instance, a shear force corresponds to movement of the outer bearing 810 along an axis parallel to the z-axis. The first rigid member 836 includes a shear force sensor 837 that records data corresponding to the shear transferred shear force. In some embodiments, the second rigid member 838 also includes a shear force sensor. The magnitude of the transferred shear force is based on the geometry of the first arm 804 and/or the second arm 806, which is further described below.

In an example use case, a user wearing a skin stretch calibration sensor including the skin stretch mechanism 800 interacts with the real object 832. In some embodiments, the real object 832 is a real surface 832 instead. For instance, the user is picking up the real object 832 in real life. Thus, the real object 832 is in contact with the outer bearing 810. Due to the weight of the real object 832 and gravity as the user is picking up the real object 832, a force acts upon the real object 832 in the negative z-axis direction. Additionally forces in other axes may also act upon the real object 832. Due to contact and friction between a surface of the real object 832 and a surface of the outer bearing 810, the outer bearing 810 transfers forces from the real object 832 to the finger 812. In particular, the force in the negative z-axis direction acting upon the real object 832 causes another force, e.g., a shear force, also in the negative z-axis direction to act upon the outer bearing 810 coupled to the outer collar 834. Consequently, the first rigid member 836 and the second rigid member 838 transfer forces to the first arm 804 and the second arm 806, respectively. In particular, the first arm 804 and the second arm 806 both rotate counter clockwise. In response to the counter clockwise rotation, the inner bearing 808 (i.e., coupled to both the first arm 804 and the second arm 806) experiences a force, e.g., a corresponding shear force, also in the negative z-axis direction, causing the inner bearing 808 to translate in the negative z-axis direction. Thus, the skin stretch mechanism 800 simulates skin stretch on the finger 812 of the user. The skin stretch mechanism 800 includes a sensor 840 that records and/or aggregates skin stretch information, e.g., shear force data from the shear force sensor 837 or normal force data from the pressure sensor 809.

In some embodiments, the first arm 804 and/or the second arm 806 are modified to adjust the amount of shear force transferred from the real object 832 to the finger 812, and thus adjust the amount of skin stretch experienced by the user. In particular, the size and/or shape of the first arm 804 and/or the second arm 806 are modified to increase and/or decrease the amount of shear force transferred, which is further described below with reference to FIG. 8B. In some embodiments, the skin stretch mechanism 800 includes an actuator that rotates the first arm 804 and/or the second arm 806. Accordingly, the rotation causes the inner bearing 808 in contact with the finger 812 to move, and thus simulate skin stretch for the user. In some embodiments, a normal force acting upon the real object 832 is transferred to the finger 812 via the outer bearing 810, cable 830, and the inner bearing 808.

One or more of the components may be smaller in size relative to the finger 812 or another component. Smaller sized components allows the skin stretch mechanism 800 to be more compact, which provides an advantage because the distance can be reduced between the surface of the finger 812 of a user wearing a skin stretch calibration sensor with the skin stretch mechanism 800 and the surface of a real object 832 (or real surface) being interacting with by the user. Thus, the interaction with the real object 832 feels more realistic to the user.

Figure 8B:
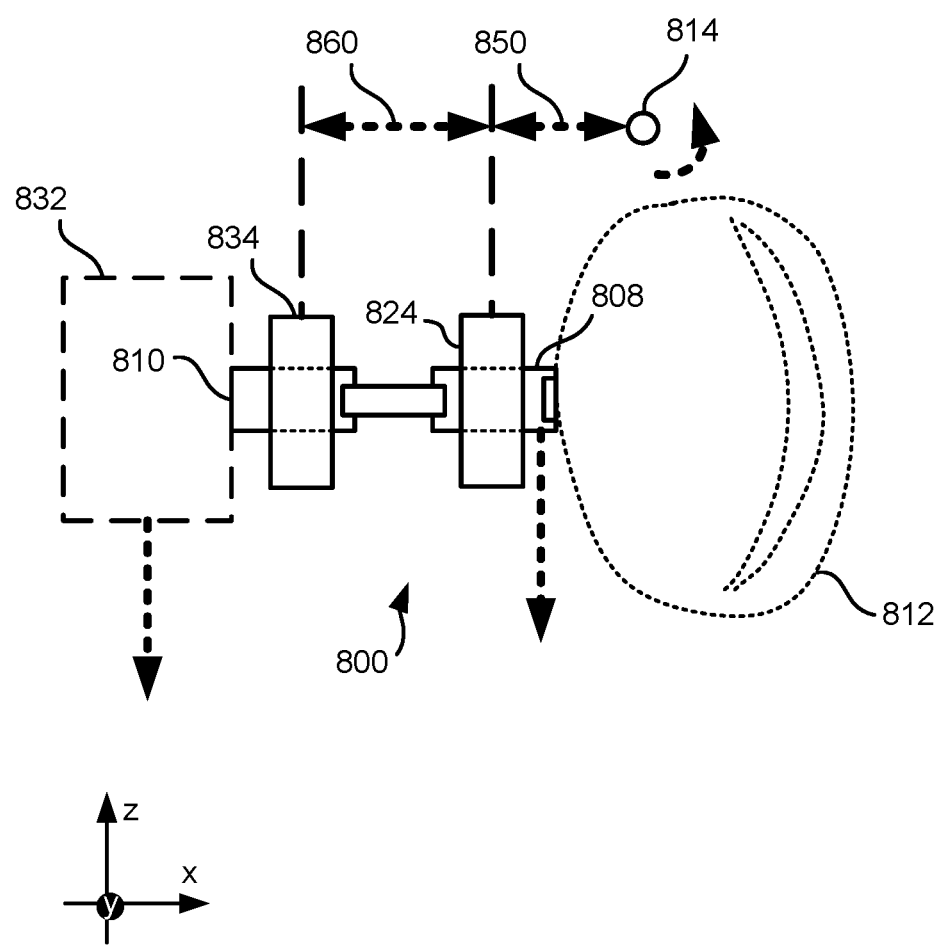
FIG. 8B illustrates an alternative diagram of the skin stretch mechanism shown in FIG. 8A, in accordance with an embodiment.

FIG. 8B illustrates an alternative diagram of the skin stretch mechanism 800 shown in FIG. 8A, in accordance with an embodiment. For purposes of clarity, only select components of the skin stretch mechanism 800 are shown in FIG. 8B. The length of the first arm 804 (shown in FIG. 8A) is represented by the length 850 ($L_{850}$) between the first joint 814 and the inner collar 824. The length of the first rigid member 836 (shown in FIG. 8A) is represented by the length 860 ($L_{860}$) between the inner collar 824 and the outer collar 834 (e.g., the midpoints of each collar in particular).

In one embodiment, the outer bearing 810 experiences a displacement ($d_{810}$) in the negative z-direction due to a corresponding displacement of the real object 832. Additionally, the inner bearing 808 experiences a displacement ($d_{808}$) in the negative z-direction, and the first rigid member 836 (coupled to the first arm 804) experiences a counter-clockwise rotation θ about the first joint 814. In use cases where the displacements and rotation are small (e.g., relative to the size of the finger 812 or the skin stretch mechanism 800), the displacements may be approximated as:

$$d_{810} \approx \theta \cdot (L_{850} + L_{860})$$

$$d_{808} \approx \theta \cdot (L_{850})$$

Thus, the displacement ($d_{808}$) may be expressed by the following ratio:

$$d_{808} \approx d_{810} \left( \frac{L_{850}}{L_{850} + L_{860}} \right)$$

Since the displacement ($d_{808}$) represents the skin stretch experienced by the finger 812 of the user, modifying the length of the first arm 804 ($L_{850}$) and/or the length of the first rigid member 836 ($L_{860}$) changes the amount of shear force transferred from the real object 832 to the finger 812. Similarly, modifying the length of the second arm 806 and second rigid member 838 (shown in FIG. 8A) may also change the amount of shear force transferred.

Figure 9:
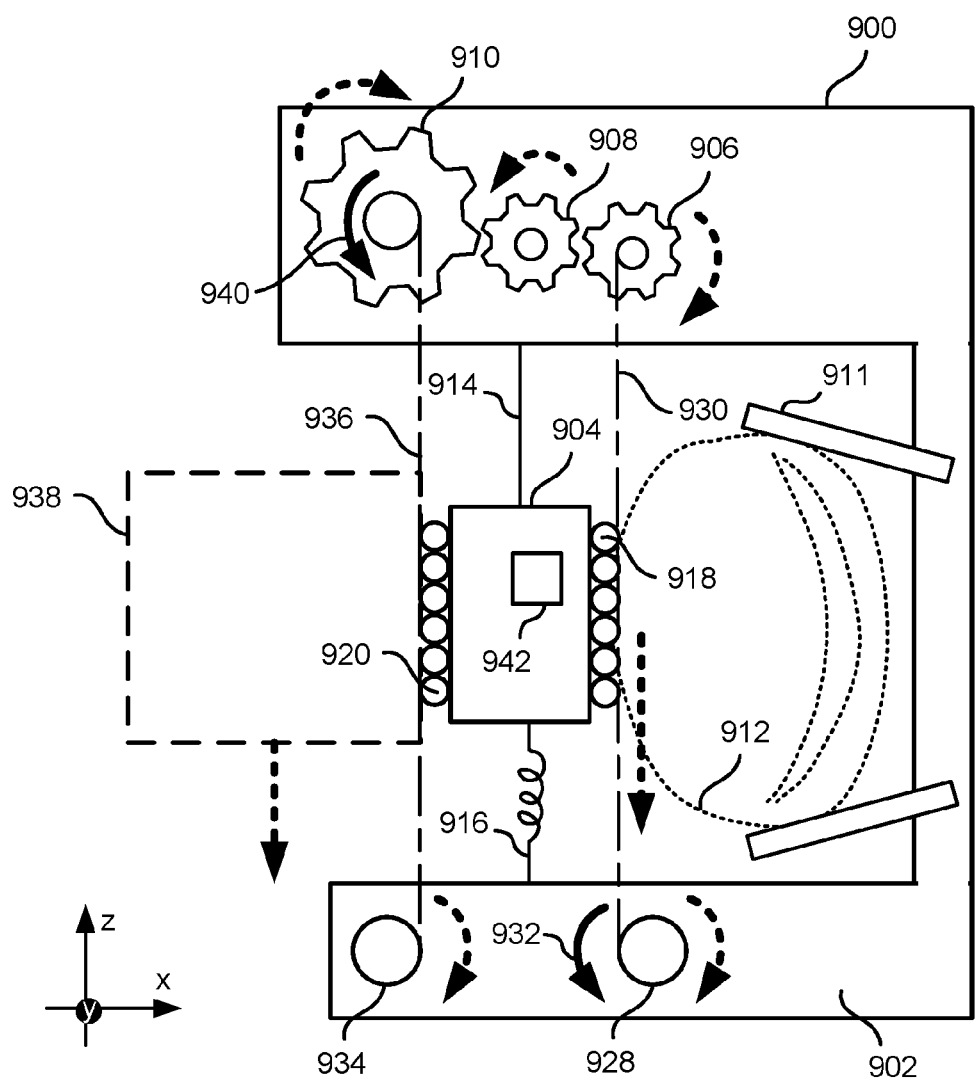
FIG. 9 illustrates yet another skin stretch mechanism, in accordance with an embodiment.

FIG. 9 illustrates yet another skin stretch mechanism 900, in accordance with an embodiment. In some embodiments, the skin stretch mechanism 900 is an embodiment of the skin stretch mechanism 350 of the skin stretch calibration sensor 300 in FIG. 3. In alternate embodiments, the skin stretch mechanism 900 is part of another system that records skin stretch caused by real objects and/or real surfaces, and/or causes skin stretch in response to interactions with virtual objects and/or virtual surfaces. The skin stretch mechanism 900 shown in FIG. 9 is not to scale, and components of the skin stretch mechanism 900 have been enlarged for purposes of clarity. For instance, in one embodiment, the base 902 and the bearings are smaller in size relative to the user's finger such that an object (that the user is interacting with) can translate along the full length of the z-axis without striking the base 902. The skin stretch mechanism 900 shown in FIG. 9 comprises a base 902, platform 904, inner bearing 906, intermediate bearing 908, and outer bearing 910, among other components. In an embodiment, the inner bearing 906, intermediate bearing 908, and outer bearing 910 are substantially the same as the outer gear 440A and/or the inner gear 440B in FIG. 4. For example, the inner bearing 906, intermediate bearing 908, and outer bearing 910 may be different sized spur gears to accommodate different gear ratios.

The base 902 holds the skin stretch mechanism 900 in a position around a finger 912 of a user. In some embodiments, the base 902 includes structural segments 911 that help maintain the position of the skin stretch mechanism 900 around the finger 912. The structural segments 911 may include a ratcheting and/or lockable component to assist in maintaining the position.

In one embodiment, the platform 904 is coupled to the base 902 by a support 914 and a damping element 916. In some embodiments, the support 914 is also a damping element similar to the damping element 916. In FIG. 9, the support 914 is a spring attached to the base 902 on one hinge and attached to the platform 904 on another hinge. The damping element 916 is a flexible structure attached to the base 902 on one hinge and attached to the platform 904 on another hinge. For example, the damping element 916 is a dashpot or viscoelastic rubber material. The support 914 and the damping element 916 help keep the position of the platform 904 within a vicinity of the finger 912, while still allowing the platform 904 to move, in a limited range of motion, about one or more axis. For example, the platform 904 may translate in directions parallel to the z-axis, while remaining within the boundaries of the base 902. Further, the platform 904 may translate minimally in directions parallel to the y-axis or x-axis. The platform includes an inner array of bearings 918 and an outer array of bearings 920. Each array of bearings includes one or more bearings that rotate about one or more axes, e.g., an axis parallel to the y-axis, x-axis, or z-axis. For example, the array includes first bearing that rotates only about the y-axis and a second bearing that rotates only about the z-axis, and thus providing traction to the array of bearings. In a different embodiment, the array includes a bearing that rotates about both the y-axis and the z-axis. The inner array of bearings 918 is coupled to a side of the platform 904 facing toward the finger 912. The outer array of bearings 920 is coupled to a side of the platform 904 facing away from the finger 912.

In one embodiment, the inner bearing 906 is coupled to an inner pulley 928 by an inner belt 930. The inner belt 930 is attached to the inner bearing 906 on one end and attached to the inner pulley 928 on the other end such that rotating either of the inner bearing 906 or the inner pulley 928 causes the other to rotate in the same direction. One side of the inner belt 930 is in contact with the inner array of bearings 918, and the other side of the inner belt 930 is in contact with a surface of the finger 912. In some embodiments, the inner belt 930 may include a feedback surface with a surface texture similar to that of a physical object. In some embodiments, the inner belt 930 may have a surface texture similar to that of a human finger. In some embodiments, the inner pulley 928 is coupled to a constant force spring that provides a restoring force 932, e.g., a rotational restoring force in the counterclockwise direction, to the inner pulley 928. In particular, the restoring force 932 eliminates slack of the inner belt 930.

In one embodiment, the intermediate bearing 908 is engaged with the inner bearing 906 such that rotating the inner bearing 906 causes the intermediate bearing 908 to rotate in the opposite direction, and vice-versa.

In one embodiment, the outer bearing 910 is engaged with the intermediate bearing 908 such that rotating the intermediate bearing 908 causes the outer bearing 910 to rotate in the opposite direction, and vice-versa. The outer bearing 910 is coupled to an outer pulley 934 by an outer belt 936. The outer belt 936 is attached to the outer bearing 910 on one end and attached to the outer pulley 934 on the other end such that rotating either of the outer bearing 910 or the outer pulley 934 causes the other to rotate in the same direction. One side of the outer belt 936 is in contact with the outer array of bearings 920, and the other side of the outer belt 936 is in contact with a real object 938 (or real surface). In some embodiments, the outer bearing 910 is coupled to a constant force spring that provides a restoring force 940, e.g., a rotational restoring force in the counter clockwise direction, to the outer bearing 910. In particular, the restoring force 940 eliminates slack of the outer belt 936. In some embodiments, the skin stretch mechanism 900 includes only one constant force spring, e.g., the constant force spring of the inner pulley 928 or the constant force spring of the outer bearing 910.

In an example use case, a user wears a skin stretch calibration sensor including the skin stretch mechanism 900 on a finger 912 of the user. The user interacts with a real object 938 (or real surface). For instance, the user is picking up the real object 938 using, at least, the finger 912. Thus, the real object 938 is in contact with the outer belt 936. Due to the weight of the real object 938 and gravity as the user is picking up the real object 938, a force, e.g., a shear force, acts upon the real object 938 in the negative z-axis direction. Additionally forces in other axes may also act upon the real object 938. Due to contact and friction between a surface of the real object 938 and a surface of the outer belt 936, the outer belt 936 transfers forces from the real object 938 to the finger 912. In particular, the force in the negative z-axis direction acting upon the real object 938 causes the outer bearing 910 and the outer pulley 934 to rotate in a clockwise direction because they are coupled by the outer belt 936. The clockwise rotation of the outer bearing 910 causes the intermediate bearing 908 to rotate in the counter clockwise direction. The counter clockwise of the intermediate bearing 908 causes the inner bearing 906 and the inner pulley 928 to rotate in the clockwise direction because they are coupled by the inner belt 930. In response to the clockwise rotation, the inner belt 930 experiences a force, e.g., a corresponding shear force, in the negative z-axis direction that causes the inner belt 930 to translate in the negative z-axis direction. Thus, the skin stretch mechanism 900 simulates skin stretch on the finger 912 of the user. The platform 904 includes a sensor 942 that records skin stretch information from the skin stretch mechanism 900, e.g., the corresponding shear force or a normal force.

In some embodiments, the gear ratio or compound gear ratio of two or more of the inner bearing 906, intermediate bearing 908, and outer bearing 910 are modified to adjust the amount of shear force transferred from the real object 938 to the finger 912, and thus adjust the amount of skin stretch experienced by the user. In some embodiments, the skin stretch mechanism 800 includes an actuator that rotates the inner bearing 906, intermediate bearing 908, and/or outer bearing 910. Accordingly, the rotation causes the inner belt 930 in contact with the finger 912 to move, and thus simulate skin stretch for the user. In some embodiments, a normal force acting upon the real object 938 is transferred to the finger 912 via the outer array of bearings 920, the platform 904, and the inner array of bearings 918.

One or more of the components may be smaller in size relative to the finger 912 or another component. Smaller sized components allows the skin stretch mechanism 900 to be more compact, which provides an advantage because the distance can be reduced between the surface of the finger 912 of a user wearing a skin stretch calibration sensor with the skin stretch mechanism 900 and the surface of a real object 938 (or real surface) being interacting with by the user. Thus, the interaction with the real object 938 feels more realistic to the user.

While the preceding discussion of embodiments refers to a haptic device 140 that is adapted to record information about and/or cause skin stretch on a user's fingers and/or hand, in other embodiments, the systems described herein with reference to a haptic device 140 can be adapted to other types of garments that sense the skin stretch of other parts of the body. For example, the systems disclosed may be applied to garments that sense the skin stretch of the user's face, arm, chest, back, feet, and the like.

Additional Configuration Considerations

The foregoing description of the embodiments of the disclosure have been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A device comprising:
a mechanical housing configured to be worn on a finger of a user;
a skin stretch mechanism coupled to the mechanical housing, the skin stretch mechanism comprising:
a first bearing that is configured to rotate in a first direction in response to an interaction with a surface, and
a second bearing coupled to the first bearing, such that rotation of the first bearing causes the second bearing to rotate in a direction opposite to the first direction, the second bearing coupled to a feedback surface that is configured to be in contact with a portion of the finger, wherein the feedback surface is configured to simulate a force associated with the interaction with the surface; and
a controller configured to monitor rotation of the second bearing and record skin stretch information responsive to the interaction with the surface.

2. The device of claim 1, wherein the first bearing and the second bearing are rollers, and the first bearing includes a first gear that rotates with the first roller and the second bearing includes a second gear that rotates with the second roller, and the first gear and the second gear are coupled together such that a rotation of the first gear causes an opposite rotation of the second gear.

3. The device of claim 2, wherein a gear ratio between the first gear and the second gear is greater than 1.

4. The device of claim 1, wherein the first bearing is a spherical bearing and the second bearing is a spherical bearing, and the first bearing and the second bearing are configured to rotate about two or more different axes.

5. The device of claim 1, wherein the skin stretch information is selected from a group that consists of: a number of rotations in a duration of time of the first bearing, a number of rotations in a duration of time of the second bearing, an angular speed of rotation of the first bearing, an angular speed of rotation of the second bearing, a direction of rotation of the first bearing, a direction of rotation of the second bearing, a type of feedback surface of the first bearing, and a type of feedback surface of the second bearing.

6. The device of claim 1, wherein the controller is further configured to communicate an instruction to the skin stretch mechanism to rotate the second bearing in response to the user interacting with a virtual surface, the instruction based at least in part on skin stretch information associated with the virtual object.

7. The device of claim 6, wherein the second bearing includes a first feedback surface, and the device further includes an additional skin stretch mechanism that includes a bearing that includes a second feedback surface that is different from the first feedback surface.

8. A device comprising:
a mechanical housing configured to be worn on a finger of a user;
a skin stretch mechanism coupled to the mechanical housing, the skin stretch mechanism comprising:
a first bearing that is configured to rotate in a first direction in response to an interaction with a surface, and
a second bearing coupled to the first bearing, such that rotation of the first bearing causes the second bearing to rotate in a direction opposite to the first direction, the second bearing coupled to a feedback surface that is configured to be in contact with a portion of the finger, wherein the feedback surface is configured to simulate a force associated with the interaction with the surface; and
wherein a controller is configured to monitor rotation of the second bearing and record skin stretch information responsive to the interaction with the surface.

9. The device of claim 8, wherein the first bearing and the second bearing are rollers, and the first bearing includes a first gear that rotates with the first roller and the second bearing includes a second gear that rotates with the second roller, and the first gear and the second gear are coupled together such that a rotation of the first gear causes an opposite rotation of the second gear.

10. The device of claim 9, wherein a gear ratio between the first gear and the second gear is greater than 1.

11. The device of claim 8, wherein the first bearing is a spherical bearing and the second bearing is a spherical bearing, and the first bearing and the second bearing are configured to rotate about two or more different axes.

12. The device of claim 8, wherein the skin stretch information is selected from a group that consists of: a number of rotations in a duration of time of the first bearing, a number of rotations in a duration of time of the second bearing, an angular speed of rotation of the first bearing, an angular speed of rotation of the second bearing, a direction of rotation of the first bearing, a direction of rotation of the second bearing, a type of feedback surface of the first bearing, and a type of feedback surface of the second bearing.

13. The device of claim 8, wherein the controller is further configured to communicate an instruction to the skin stretch mechanism to rotate the second bearing in response to the user interacting with a virtual surface, the instruction based at least in part on skin stretch information associated with the virtual object.

14. The device of claim 13, wherein the second bearing includes a first feedback surface, and the device further includes an additional skin stretch mechanism that includes a bearing that includes a second feedback surface that is different from the first feedback surface.

15. A device comprising:
a mechanical housing configured to be worn on a finger of a user;
a skin stretch mechanism coupled to the mechanical housing, the skin stretch mechanism comprising:
a first bearing that is configured to rotate in a first direction in response to an interaction with a surface, and
a second bearing coupled to the first bearing, such that rotation of the first bearing causes the second bearing to rotate in a direction opposite to the first direction and the first bearing and the second bearing are geared such that a rate of rotation for the first bearing causes a different rate of rotation in the second bearing, the second bearing coupled to a feedback surface that is configured to be in contact with a portion of the finger, wherein the feedback surface is configured to simulate a force associated with the interaction with the surface; and a controller configured to monitor rotation of the second bearing and record skin stretch information responsive to the interaction with the surface.

16. The device of claim 15, wherein the first bearing and the second bearing are rollers, and the first bearing includes a first gear that rotates with the first roller and the second bearing includes a second gear that rotates with the second roller, and the first gear and the second gear are coupled together such that a rotation of the first gear causes an opposite rotation of the second gear.

17. The device of claim 15, wherein the first bearing is a spherical bearing and the second bearing is a spherical bearing, and the first bearing and the second bearing are configured to rotate about two or more different axes.

18. The device of claim 15, wherein the skin stretch information is selected from a group that consists of: a number of rotations in a duration of time of the first bearing, a number of rotations in a duration of time of the second bearing, an angular speed of rotation of the first bearing, an angular speed of rotation of the second bearing, a direction of rotation of the first bearing, a direction of rotation of the second bearing, a type of feedback surface of the first bearing, and a type of feedback surface of the second bearing.

19. The device of claim 15, wherein the controller is further configured to communicate an instruction to the skin stretch mechanism to rotate the second bearing in response to the user interacting with a virtual surface, the instruction based at least in part on skin stretch information associated with the virtual object.

20. The device of claim 19, wherein the second bearing includes a first feedback surface, and the device further includes an additional skin stretch mechanism that includes a bearing that includes a second feedback surface that is different from the first feedback surface.

* * * * *